A. B. WALLEM.
COMBINATION WATER HEATING AND MEASURING APPARATUS.
APPLICATION FILED MAR. 26, 1913.
1,117,535.
Patented Nov. 17, 1914.
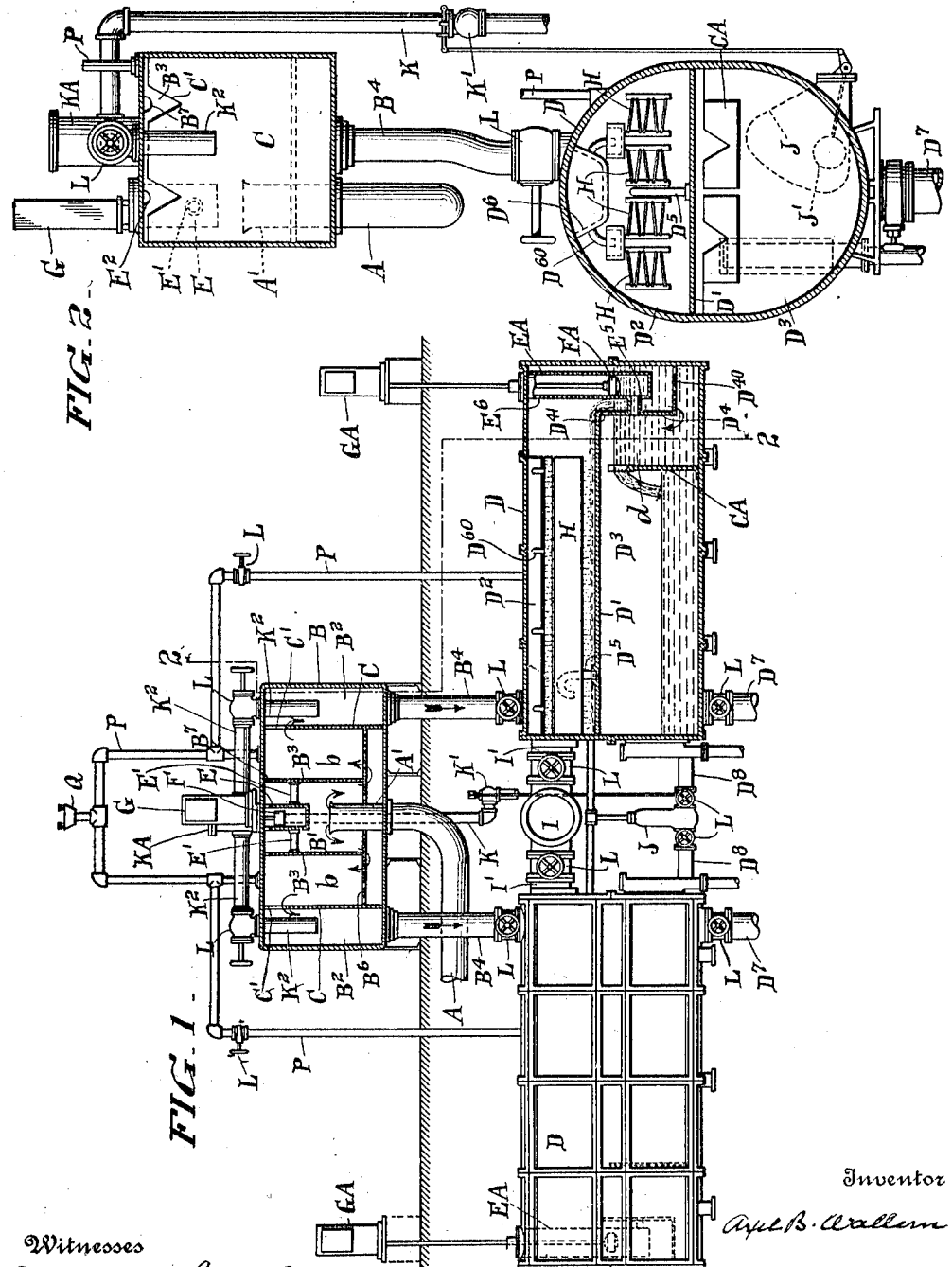

UNITED STATES PATENT OFFICE.

AXEL B. WALLEM, OF CYNWYD, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, A FIRM DOING BUSINESS AS HARRISON SAFETY BOILER WORKS.

COMBINATION WATER HEATING AND MEASURING APPARATUS.

1,117,535. Specification of Letters Patent. Patented Nov. 17, 1914.

Application filed March 26, 1913. Serial No. 756,861.

*To all whom it may concern:*

Be it known that I, AXEL B. WALLEM, a citizen of the United States of America, residing in Cynwyd, in the county of Montgomery and State of Pennsylvania, have invented certain new and useful Improvements in Combination Water Heating and Measuring Apparatus, of which the following is a true and exact description, reference being had to the accompanying drawings, which form a part thereof.

My present invention relates to apparatus for measuring the flow of liquids, and particularly to apparatus for measuring the water passing through water heating apparatus.

One object of my present invention is to provide simple and effective means for properly dividing and obtaining a measure of the amount of water passing through a common supply connection to a plurality of water heaters.

Another object of my invention is to provide simple and effective apparatus for measuring the amount of water passing through a common supply connection to a plurality of water heaters, and for obtaining an individual measure of the total amount of water discharged from each heater, regardless of whether some or all of this water may have come from some other source than said common supply connection.

The various features of novelty which characterize my invention, are pointed out with particularity in the claims annexed to and forming a part of this specification. For a better understanding of the invention, however, and of the advantages possessed by it, reference should be had to the accompanying drawings and descriptive matter in which I have illustrated and described a preferred form of apparatus embodying my invention.

Of the drawings: Figure 1 is an elevation, partly in section, of a combined water heating and measuring plant; and Fig. 2 is a section on the broken line 2—2 of Fig. 1.

In the drawings A represents a pipe supplying water to be heated to a plurality of water heaters D. The pipe A may and in such an arrangement as is shown in the drawings would ordinarily run from a condenser hot well. In the particular arrangement shown there are two water heaters D, which are similar to each other. The pipe A discharges into the inlet chamber B′ of a receptacle B. As shown, the outlet compartments $B^2$ of the receptacle B, of which there are one for each heater D, are each separated from the inlet chamber by a weir plate C formed with one or more discharge notches or V-orifices C′ at its upper edge. Each outlet compartment $B^2$ is connected by a pipe $B^4$ to the water inlet of a corresponding heater D. To avoid eddy currents on the supply side of each weir C, baffles $B^3$ and a perforated diaphragm $B^6$ are interposed between the weir plates and the discharge end A′ of the pipe A which extends into the weir receptacle. With this arrangement the inlet compartment B′ is divided into a central chamber into which the pipe A discharges and two still water chambers $b$, one adjacent each weir.

The means for measuring the water passing through the weir orifices C′, comprise a float chamber E closed at its lower end and extending into the upper end of the compartment B′ between the baffles $B^3$. The float chamber E is connected by the pipes E′ to the still water chambers $b$ below the lowermost level of flow over the weirs C. A float F working in the float chamber E is connected to and operates suitable indicating or recording mechanism located in the receptacle G mounted on top of the receptacle B. Ports $B^7$ are formed in the baffles $B^3$ above the water line to equalize the vapor pressure in the still water chambers $b$ and central chamber of the receptacle B′ and vapor equalizing ports $E^2$ are formed in the cylinder E above the water level.

Each heater D in the particular form shown is divided into an upper heating chamber $D^2$ and a lower weir chamber $D^3$ by the horizontal partition D′. These chambers are connected at one end of the heater, and a baffle $D^4$ and perforated diaphragm $D^{40}$ are provided to insure a quiet flow of water from the chamber $D^2$ into the still water compartment $d$ of the weir chamber $D^3$. The water overflows from the still water chamber $d$ into the outlet compartment of the weir chamber over a weir CA which may be generally similar to the weirs C hereinbefore described.

$D^5$ represents a pipe connection for equalizing the vapor pressure in the chambers D² and D³, and D⁴¹ represents ports formed in the baffle D⁴ for the same purpose. The still water chambers $b$ and the heaters D are connected to the atmosphere by the vent piping P and the usual non-return valve Q.

In the chamber D² are located the usual baffles or trays H over wich the water to be heated flows in film-like and broken streams. The water is discharged onto the trays H through spouts D⁶⁰ leading from the sides of a water trough D⁶ located at the top of the chamber D² and into which the corresponding pipe B⁴ discharges. Steam for heating the water passing to the heaters D is supplied through a common steam supply pipe I and the branches I' thereof which run one to each heater.

D⁷ represent the discharge pipes from the heaters which may be connected to boiler feed water pumps or other devices for handling or utilizing the water heated. As shown, the outlet compartment of the weir chamber D³ of each heater is connected by a branch pipe D⁸ to a common float box J. The float J' therein is connected to and operates a valve K' in the makeup water supply pipe K. The latter leads to a dividing box KA from which branches K² extend one into each outlet compartment B² of the receptacle B. The float J' operates to open the valve K' and thus increases the water passing to the heaters when the water supplied through the common water supply connection A is insufficient to maintain a predetermined height of water level in the outlet compartments of the weir chambers D³ of the heaters D.

To obtain a measure of the water actually passing through each heater, a float chamber EA is provided for each heater, each chamber EA being connected as by the pipe connection E⁵ to the still water compartment $d$ of the corresponding heater.

E⁶ represent vapor pressure equalizing ports formed in the upper ends of the chambers EA. Working in each float chamber EA is a float FA connected to and operating suitable indicating or recording mechanism located in the corresponding mechanism casing GA. Valves L are provided in the various pipe connections whereby either heater D may be cut out of service without interfering with the operation of the other heater, when this is desirable.

With the apparatus described the water passing into the receptacle B through the pipe A will be divided and passed in definite proportions into the two outlet compartments B² of the receptacle B and from thence into two heaters. If the weir notches C' in the two weir plates are similar in number and shape and have their apices located at the same level, as will ordinarily be the case, the water supplied through the pipe A will be equally divided between the two heaters. However the weir notches may be arranged to divide the water between the different heaters, the total amount of water flowing over the weirs C will be a function of the height of water level on the supply side of the weirs, and the measuring mechanism operated by the float F will thus furnish a measure of the total amount of water supplied by the pipe A. Furthermore, the measuring apparatus operated by each float FA will give a correct measure of the total amount of water passing through the corresponding heater, regardless of what proportion of that water may have come from the hot well of the condenser through the pipe A, or may be makeup water supplied through the pipe K and branch pipe K², or may be water of condensation formed from the steam passed into the heater through the corresponding branch pipe I'. The apparatus described thus forms simple, compact and effective apparatus for obtaining a measure of the total amount of water taken from the condenser hot well, for dividing this water in a predetermined manner between the heaters, and for obtaining a measure of the water discharged from each heater, regardless of the source or sources from which this water is derived.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. The combination with a plurality of water heaters, of a receptacle having an inlet chamber and a plurality of weir notches or orifices through which water supplied to said inlet chamber may overflow in separate and proportional streams to the different heaters, means for supplying water to said inlet chamber, and means responsive to the varying accumulation of water in said inlet chamber for obtaining a measure of the flow of water through said chamber.

2. The combination with a plurality of water heaters, of a receptacle having an inlet chamber and a plurality of weir notches or orifices through which water supplied to said inlet chamber may overflow in separate and proportional streams to the different heaters, means for supplying water to said inlet chamber, and means responsive to the varying accumulation of water in said inlet chamber for obtaining a measure of the flow of water through said chamber, and other means individual to each heater for measuring the water passing through the heater.

3. The combination with a plurality of water heaters, of a receptacle having an inlet chamber and a plurality of weir notches or orifices through which water supplied to said inlet chamber may overflow in separate and proportional streams, conduits receiving the different streams and conveying them to the different heaters, means for supplying water to said inlet chamber, and means responsive to the varying accumulation of water in said inlet chamber for obtaining a measure of the flow of water through said chamber.

4. The combination with a plurality of water heaters, a common water supply connection for the heaters, of apparatus for measuring the water supplied by said source, and for dividing the water thus furnished between the different heaters, comprising a receptacle having an inlet chamber connected to and receiving water from said source and a plurality of outlet chambers one for and discharging into each of said heaters, and weir notches or orifices through which the water supplied to said inlet chamber may overflow in separate and proportional streams to the different heaters, and means responsive to the accumulation of water in said inlet chamber for determining the rate of flow over said weirs, and a plurality of flow measuring devices one for and connected to each of said heaters for separately measuring the total volume of water passing through each heater.

5. The combination with a plurality of water heaters of a receptacle having an inlet chamber, a plurality of outlet chambers one for and discharging into each heater, and a plurality of weir notches or orifices through which water supplied to said inlet chamber may overflow in separate and proportional streams into the different outlet chambers, a water supply connection to said inlet chamber, means, including governing means responsive to the accumulation of water in said heaters, for supplying water directly to said outlet chambers, means responsive to the varying accumulation of water in said inlet chamber for obtaining a measure of the flow of water through said chamber, and separate means for individually measuring the water passing through each heater.

6. The combination with a plurality of water heaters of a receptacle having an inlet chamber and a plurality of weir notches or orifices through which water supplied to said inlet chamber may overflow in separate and proportional streams to the different heaters, means for supplying water to said inlet chamber, means responsive to the varying accumulation of water in said inlet chamber for obtaining a measure of the water passing through said chamber, a separate weir chamber for and receiving the water passing through each heater, a weir located in each weir chamber, means responsive to the varying accumulation of water on the supply side of each of said weirs for obtaining a measure of the water flowing through the corresponding heater, and means responsive to the accumulation of water in the outlet compartments of said weir chambers for controlling an independent supply of water to said heaters.

AXEL B. WALLEM.

Witnesses:
  ROBERT G. CLIFTON,
  N. G. COOK.

Copies of this patent may be obtained for five cents each, by addressing the "Commissioner of Patents, Washington, D. C."